Jan. 30, 1945.  G. A. LYON  2,368,246
WHEEL STRUCTURE
Filed June 2, 1943  2 Sheets-Sheet 2
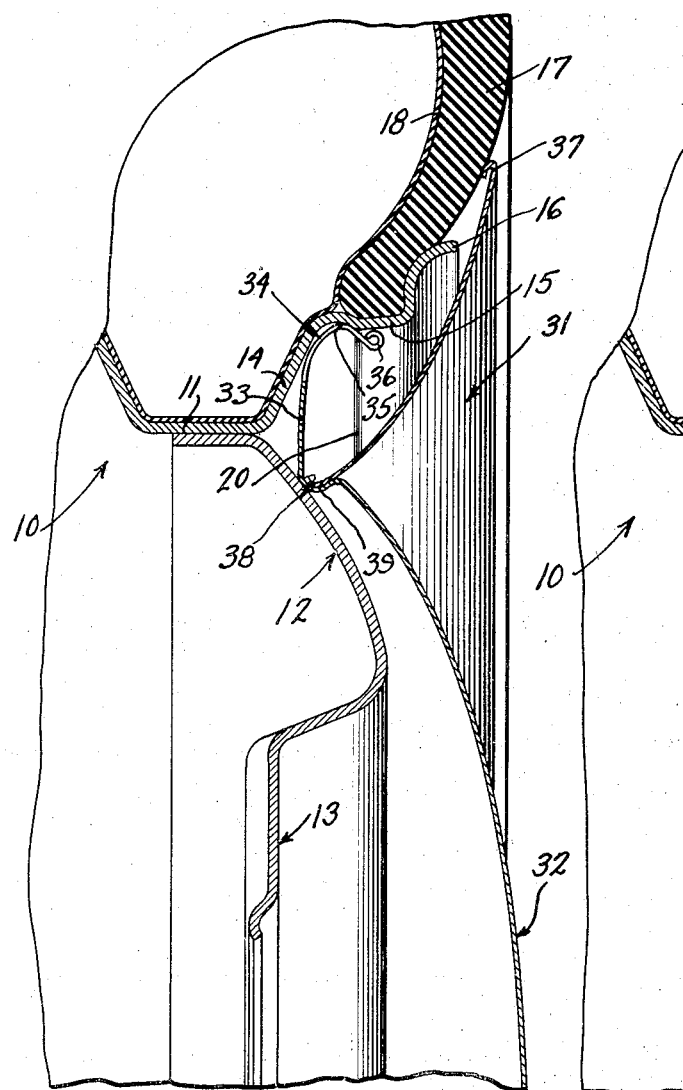
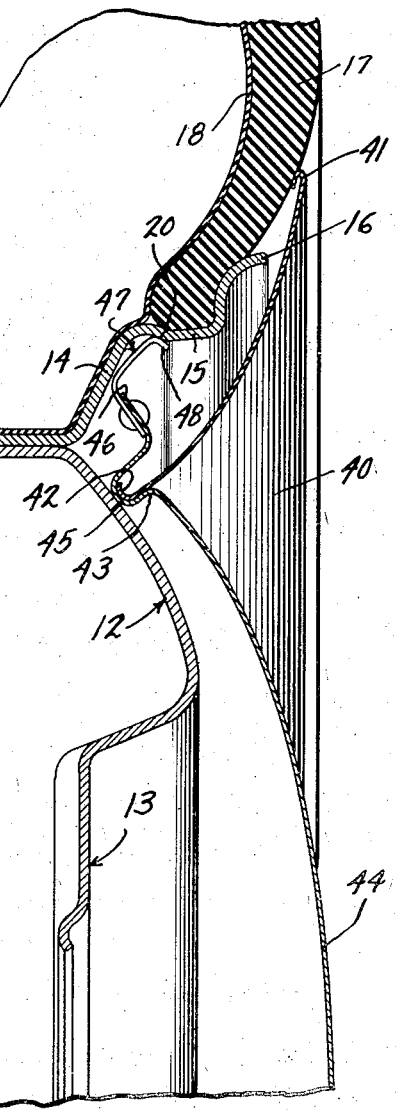
Inventor
GEORGE ALBERT LYON.
by Charles W Hills Attys.

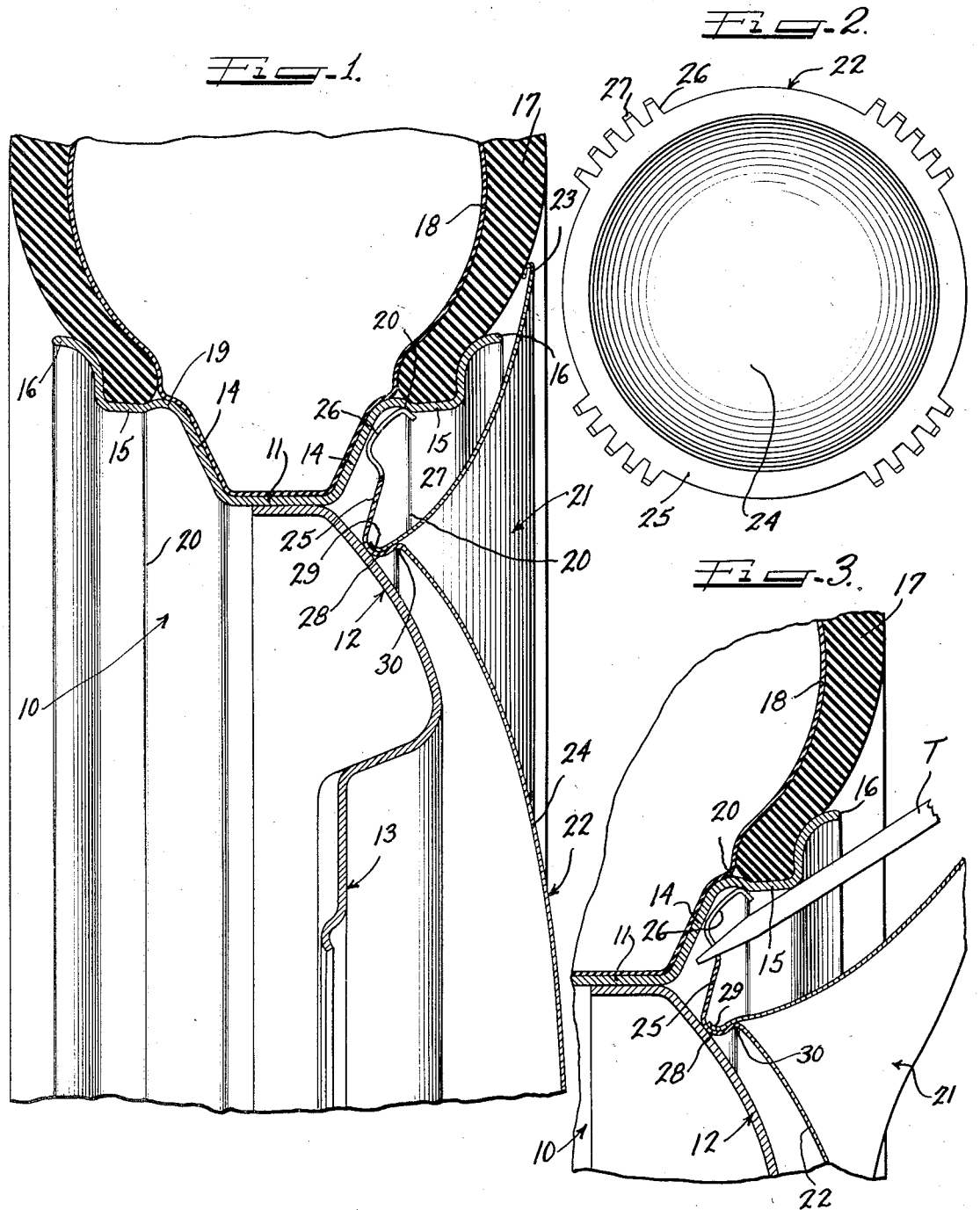

Patented Jan. 30, 1945

2,368,246

UNITED STATES PATENT OFFICE 2,368,246

WHEEL STRUCTURE

George Albert Lyon, Allenhurst, N. J.

Application June 2, 1943, Serial No. 489,313

2 Claims. (Cl. 301—37)

This invention relates to an improved wheel structure and is directed more particularly to an improved cover assembly therefor.

It is a principal object of the invention to provide an improved retaining arrangement for securing a cover assembly over the outer side of a wheel structure.

Still another object of the invention is to provide an improved multipart cover assembly for disposition over the outer side of a wheel structure and in which the various parts may be secured together so that the cover assembly may be removed from the wheel structure as a unit.

Still another object of the invention is to provide for a wheel structure an improved cover assembly including a central part arranged for detachable engagement to the wheel structure and an annular part retained by the circular part and disposed thereover to conceal the retaining means thereon.

It is still another object of the invention to provide for a wheel structure a cover assembly including a central part and an outer annular part, said annular part being formed from a resiliently, elastically flexible material such as synthetic plastic sheet or the like, the central part having means thereon for elastically receiving the inner marginal portion of the annular part, thereby to provide a unitary, multi-part cover assembly.

In accordance with the general features of this invention, there is provided herein, for a wheel structure including a tire rim and a central load-bearing portion, a cover assembly including an outer annular part and a central circular portion, the central circular portion having at the radially outer part thereof for detachably engaging the tire rim of the wheel structure and being formed at an intermediate part thereof to retainingly receive the inner peripheral portion of the outer annular cover part, whereby the latter overlies the radially outer retaining means of the central cover part to conceal the same and whereby there is provided a unitary multi-part cover assembly.

In accordance with other general features of this invention, there is provided herein a multi-part cover assembly including a central circular portion having wheel engaging means at the radially outer portion thereof and being formed at an intermediate part thereof to elastically receive a portion of an annular cover part formed to overlie the retaining means of the circular cover part and having a cross-sectional configuration of such curvature and magnitude that it extends over the tire rim of a wheel structure to which the cover assembly is secured and radially inwardly of the wheel structure, thereby to constitute, in effect, a continuation of the side wall of a tire in the tire rim of an associated wheel structure to give the appearance of being a part thereof and to give the appearance of being a white side wall of the tire when colored white, said annular cover being formed from a resiliently, elastically flexible, self-sustaining, form-retaining material such as a synthetic plastic or the like, this flexibility rendering the rear side of the cover member accessible for purpose of a pry-off operation, for inflation of a tire or for the adjustment of wheel balancing weights or other appurtenances associated with the tire rim or other parts of the wheel structure, without the necessity of detaching the cover from the wheel. Furthermore, the cover, by virtue of its self-sustaining characteristics, will snap back into its initially intended position relative to the wheel structure and retain itself in this position.

Still another object of the invention is to provide for a wheel structure a multi-part cover assembly including a resiliently, elastically flexible part and a second part formed to elastically, retainingly receive the flexible part in retained relationship, thereby to provide a unitary multi-part cover assembly.

Other objects and advantages of the invention will become apparent from the following description and accompanying drawings, in which:

Figure 1 is a fragmentary cross-sectional view of a wheel structure embodying one form of my invention;

Figure 2 is a side elevation of one of the parts of the cover assembly shown in Figure 1;

Figure 3 is a fragmentary cross-sectional view of the wheel structure shown in Figure 1, with the parts disposed in a position to receive a pry-off tool for removal of the cover assembly from the wheel structure;

Figure 4 is a fragmentary cross-sectional view of a wheel structure embodying a modified form of my invention; and Figure 5 is a fragmentary cross-sectional view of a wheel structure embodying a still further modified form of my invention.

It will be understood that the embodiments shown herein are for illustrative purposes and may be changed or modified without departing from the spirit and scope of the invention as set forth in the appended claims.

Referring to the drawings, and particularly to Figure 1, the reference character 10 designates generally a multi-flange drop center tire rim having a base flange 11 to which is secured, as by riveting or welding or the like, a central body portion 12 having a bolt-on flange 13. The tire rim is further provided with opposite side flanges 14, opposite intermediate flanges 15 and opposite edge portions 16, there being a conventional pneumatic tire 17 having an inner tube 18 shown disposed in inflated condition in the tire rim.

In the form of tire rim shown herein the intermediate flanges 15 are provided with radially outwardly extending beaded portions 19 at the axially inner part thereof, these beaded portions providing tire bead retaining walls at the radially outer surface of the tire rim and providing shoulders 20 at the radially inner surface thereof. While many different expedients may be utilized for detachably engaging the cover assembly, to be described presently, to the wheel structure, the shoulders 20 are utilized in the present instance for this purpose.

The cover assembly shown herein includes an outer annular part 21 and a central circular or disk-like part 22. The outer annular part 21 is provided with a cross-sectional configuration of such shape and magnitude that it extends radially outwardly beyond the edge portion 16 of the tire rim 10 into adjacency with the side wall of the tire 17, there being a turned-back flange 23 at the outer peripheral margin of the cover member for presenting a somewhat reinforced, smooth surface to the tire to prevent wear thereof under conditions to be described presently. The cover member 21 also extends radially inwardly with a gradual curvature to a point on the central body part of the wheel, whereby it constitutes, in effect, a continuation of the side wall of the tire to give the appearance of being a part thereof.

With such a construction, it will be understood that the tire rim is entirely concealed, as are various appurtenances such as wheel balancing weights and the like, or cover retaining means which are associated therewith. Accordingly, in order to avoid the necessity of repeated removal of the cover member 21 from the wheel structure so that appurtenances behind the cover may be accessible, it is desirable that the cover be locally deflectable, temporarily, to afford access to the rear side thereof. To this end, as indicated previously, the cover member is constructed from an elastically, resiliently flexible material such as sheet synthetic plastic or the like, whereby it may be flexed axially outwardly away from the wheel structure when desired and will, itself, return to its initial position on the wheel when again free to move. This position is then retained by the cover, by virtue of the self-sustaining characteristics thereof.

Another important advantage of the provision of a temporarily flexible cover is brought about by the radially outward extension of the outer peripheral edge thereof into the vicinity of the side wall of the tire. It will be understood that when the wheel is operated under load-bearing conditions, each part of the tire, as it reaches the lower side thereof, will expand laterally under load pressure and with the foregoing construction it will be seen that this lateral expansion can be temporarily accommodated by the cover, whereupon the cover will flex back to the position shown in Figure 1 with contraction of the tire when the load is relieved therefrom.

The central cover portion 22 comprises a central crown part 24 and a substantially radially outwardly extending marginal flange 25 from which extend radially disposed retaining fingers 26 which terminate in obliquely disposed, radially inwardly, axially outwardly extending tip portions 27. The circle prescribed by the radial outward extremity of the fingers 27, as shown in Figure 2, is slightly greater than that of the circle prescribed by the radially outer extremity of the groove formed by the beaded portion 19 in the intermediate flange 15 of the tire rim 10 and thus, since the fingers 26 are resilient, it will be seen that axial inward movement of the cover member 22 toward the wheel structure will cause the fingers 26 to be deflected radially inwardly until the shoulder 20 has been passed, whereupon the fingers will again spring radially outwardly into the position shown in Figure 1 and thus will secure the cover 22 to the wheel structure with an easy-on hard-off attachment.

It will be seen that the radial flange or skirt 25 and the central portion 24 of the cover member 22 are integrally joined by means of a radially outwardly opening groove formation 28 in the cross-sectional configuration of the cover member 22. This groove is arranged to receive the curved inner marginal portion 29 of the resiliently flexible cover member 21 and the latter may be quickly and easily attached to the cover member 22 by merely elastically applying the margin 29 thereof over the radially outwardly extending circular rib 30 on the cover member 22 until the margin 29 comes to rest elastically in the groove 28. Thus there is provided a multipart cover assembly in which the parts may be secured together to provide a unitary structure, the cover member 21 being arranged to effectively conceal the outer side of the tire rim and the radially outwardly extending retaining means 26 on the cover member 22.

Another aspect of the invention is the protection afforded by the cover member 21 to the cover member 22. In removing the cover assembly above described from the wheel structure it is merely necessary that the cover member 21 be flexed axially outwardly as shown in Figure 3 whereupon a pry-off tool T may be inserted axially inwardly of the wheel structure with the point thereof disposed between any two of the finger members 26 and an intermediate part thereof disposed against the curved junction between the edge portion 16 and the intermediate flange 15, the latter point serving as a fulcrum. When the handle of the tool is moved radially outwardly, the point thereof will be moved radially inwardly to release one of the four groups of teeth 26 as shown in Figure 2 whereupon the cover assembly may be urged axially outwardly of the wheel structure to accomplish removal of the remaining teeth 26 therefrom. During this operation it is found that often the cover assembly jumps out of the control of the operator and falls upon the ground, under which circumstances the retaining fingers are often bent to detrimentally effect further retaining engagement between the cover and the wheel assembly. In the present instance, however, it will be seen that, since the outer cover portion 21 is flexible, it will not be seriously effected by engagement with a hard surface and at the same time, since it extends radially outwardly beyond the fingers 26, the latter are protected thereby.

In the construction shown in Figure 4, the cover parts 31 and 32 are constructed and arranged in a manner similar to the parts 21 and 22 of the construction of Figure 1. In this construction, however, the radially outer flange 33 of the central circular or disk-like cover part 33 extends directly radially outwardly with respect to the wheel structure and terminates in a plurality of resilient attachment fingers 34, each of which is provided with a radially outwardly extending hump 35 and terminates in a curled portion 36. In this cover construction the characteristics and attributes described in conjunction with the construction of Figure 1 are also present. As in the construction of Figure 1 the cover member 31 is provided with a turned back outer peripheral margin 37 and a rounded inner peripheral margin 38 while the cover member 32 is provided with a radially outwardly extending groove 39 arranged to receive the portion 38 of the cover member 31.

In the construction of Figure 5 the outer annular, resiliently flexible cover member 40 is provided with a turned back outer peripheral margin 41 and a curled inner peripheral margin 42, the latter being arranged to be elastically applied over a radially outwardly extending hump 43 of the central circular cover member 44 so that it may be disposed in nested relationship within the outwardly opening groove 45 of the cover member 44.

In the construction of Figure 5 the cover member 44 is provided with a radially outer marginal flange 46 to which is riveted a plurality of attachment fingers 47, these fingers terminating in obliquely disposed radially inwardly, axially outwardly extending tip portions 48, the junction of the tip portions 48 with the remaining part of the resilient fingers prescribing a circle of greater diameter than that prescribed by the portion of the radially inner surface of the intermediate flange 15 engaged thereby, this portion of the surface being disposed axially inwardly of the shoulder 20. Thus, as in the case of the constructions of Figures 1 and 4, axial inward movement of the cover member 44 causes the fingers 47 to spring resiliently, radially inwardly as the radial outer extremity thereof passes over the shoulder 20 whereupon the fingers spring radially outwardly to hold the cover member 44 on the wheel structure. Likewise the cover member 40 is secured to the circular intermediate groove 45 of the cover member 44 by being elastically sprung thereinto whereupon a multi-part unitary cover assembly is obtained.

From the foregoing it will be seen that there is provided herein a cover assembly having a cross-sectional configuration of such shape and magnitude that the outer part thereof extends radially outwardly beyond the edge portion 16 of the tire rim and into adjacency with the side wall of the tire 17 therein, thereby to constitute, in effect, a part of the tire and to give the appearance of being a side wall thereof, the outer portion of the cover assembly being resiliently flexible first so that it may be retainingly secured to the central disk portion of the cover assembly and secondly, so that it may flex locally, resiliently, temporarily either to accommodate lateral expansion of the tire 17 during operation under load bearing conditions or to render the rear side thereof accessible for servicing of appurtenances associated with the wheel. Furthermore, there is provided a cover construction in which the central circular part is provided at its radially outer portion with retaining means for providing an efficient detachable securing attachment to the wheel structure, the annular cover portion being so constructed and arrange as to entirely conceal the aforementioned retaining means.

What I claim is:

1. In a cover assembly for disposition over the outer side of a wheel structure, a resiliently flexible, relatively frangible, annular cover member and a relatively rigid circular retaining member having means for detachably engaging a wheel and a radially outwardly opening circular groove formed therein, said annular cover member having means at the inner periphery thereof for engaging in said circular groove to retain the same on said relatively rigid member and to afford axial outward, local flexure of said annular cover member said retaining member including a plurality of resilient fingers each formed with a turned extremity for slidable dettachable engagement in a recess in the wheel.

2. The cover structure of claim 1 further characterized by the retaining member having a central portion of crown shape to simulate a hub cap at the center of the wheel.

GEORGE ALBERT LYON.